United States Patent [19]
Gertel et al.

[11] Patent Number: 5,549,269
[45] Date of Patent: Aug. 27, 1996

[54] GAS SPRING ASSEMBLY

[76] Inventors: Maurice Gertel, 77 Florence St., Chestnut Hill, Mass. 02167; Robert G. Haynes, 53 Skelton Rd., Burlington, Mass. 02183

[21] Appl. No.: 288,291

[22] Filed: Aug. 10, 1994

Related U.S. Application Data

[63] Continuation-in-part of Ser. No. 858,569, Mar. 27, 1992, Pat. No. 5,348,266.

[51] Int. Cl.$^6$ .................................................. F16M 13/00
[52] U.S. Cl. ........................ 248/562; 248/636; 248/619; 267/64.21
[58] Field of Search ....................... 248/630, 615, 248/622, 621, 632, 634, 638, 562, 618, 619, 636; 267/140.4, 35, 64.27, 64.21, 122; 188/378

[56] References Cited

U.S. PATENT DOCUMENTS

| | | | |
|---|---|---|---|
| 3,128,978 | 4/1964 | Sykes | 267/140.4 X |
| 3,826,507 | 7/1974 | Brand et al. | 267/35 X |
| 4,211,429 | 7/1980 | Howard | 267/35 X |
| 4,360,184 | 11/1982 | Reid, III | 248/619 X |
| 4,518,154 | 5/1985 | Merkle | 267/64.27 X |
| 4,533,109 | 8/1985 | Delam | 248/618 X |
| 4,679,775 | 7/1987 | Funaki et al. | 267/64.27 |
| 4,688,774 | 8/1987 | Warmuth, II | 267/64.21 |
| 4,911,416 | 3/1990 | Warmuth, II | 267/64.21 X |
| 5,135,203 | 8/1992 | Wijnhoven et al. | 267/64.21 |

*Primary Examiner*—Karen J. Chotkowski
*Attorney, Agent, or Firm*—Iandiorio & Teska

[57] ABSTRACT

A gas spring including a housing, and a rolling convolution type flexible gas seal supporting a piston within the housing. The piston has a chamber and a resilient vibration damper unit resides within the chamber for reducing the horizontal stiffness of the gas spring.

10 Claims, 4 Drawing Sheets

GAS SPRING ASSEMBLY

RELATED INVENTIONS

This application is a continuation-in-part application of application Ser. No. 07/858,569 filed Mar. 27, 1992 now U.S. Pat. No. 5,348,266.

FIELD OF INVENTION

This invention relates to a reduced horizontal stiffness gas spring assembly for a vibration isolation system in which a resilient vibration damper unit resides in a chamber in the piston of the gas spring assembly for providing a rocking or pivoting motion when forces are transmitted in a direction other than along the axis of the gas spring assembly.

BACKGROUND OF INVENTION

Often, critical or very sensitive measurements must be made in a laboratory or on the manufacturing floor of a building wherein precision table top equipment such as electron microscopes and other microprecision equipment or machines are used for research, manufacturing, and quality control. Vibrations would otherwise adversely affect such equipment and hence vibration isolation systems are incorporated to suppress the vibrations and shocks occurring in the area the measurements are to take place. The vibrations may be the result of the natural frequency of the surrounding structure or due to extraneous elements such as rotating machinery or even other man made vibrations which enter the structural skeleton of the building and are subsequently transmitted throughout the building. Vibrations will be transmitted to the precision equipment at various frequencies and the vibrations will have both vertical and horizontal components.

Air or gas springs incorporated into vibration isolation system mounts are known which include convoluted diaphragm seal and piston type springs as well as conventional bellows type airsprings. These types of vibration isolation systems adequately provide vibration attenuation in the axial (vertical) direction. Axial vibration isolation is achieved in general by lowering the stiffness of the system in the axial direction to the extent that the system will still support the table top, platform, or other surface on which the precision equipment is located.

The object of these systems is to reduce the natural frequency and the stiffness of the mount and thereby increase the efficiency of vibration isolation. In a convolution air seal piston type vibration isolator, the natural frequency is a function of the air volume, the load support interface area, and the static load pressure.

Unfortunately, however, most of these types of airsprings are inherently stiff in the horizontal direction. As a consequence, vibration isolation is significantly less efficient horizontally than for the vertical direction.

Accordingly, different techniques have been employed to improve horizontal vibration isolation in air or gas springs. For example, one notable improvement, U.S. Pat. No. 4,223,762, employs a floating member within the piston of a convoluted diaphragm seal arrangement. Inner floating balls that ride in a hardened ball race of the floating member reduce vibrations in a direction orthogonal to the axis of the airspring while the airspring itself reduces vibration in the direction along the axis of the airspring. Alternatively, the floating member may be connected to one end of the airspring cylinder. Other techniques to reduce horizontal vibration also employ various modification of the piston itself including adding cables or rods to a hollow piston (U.S. Pat. No. 3,784,146) or a concentric load supporting rod pivotably engaging the bottom of a well of the piston (U.S. Pat. No. 4,360,184) which permits gimbel like rotation of the piston for horizontal movement of the load. As can be appreciated, each of these devices used to isolate the horizontal component of vibrations transmitted to the air piston assembly require substantial mechanical structure and intricate and generally close tolerance or precision fabrication techniques. One other prior technique employs a multilaminated rubber and stabilizing plate assembly integrally connected to a bellows type airspring (U.S. Pat. No. 5,018,701). Because the focus of this teaching is for earthquake vibration isolation of a floor structure, vertical guide posts are used to restrain displacement of the airspring only in the vertical direction. Accordingly, when used in a load support system with multiple supports, the rubber laminate assembly is only displaceable in the vertical or horizontal direction. Unfortunately, this configuration does not allow the airspring assembly itself to be displaced other than directly in compression in the vertical direction. That is, the airspring can not be deflected horizontally nor can it rock or pivot or rotate along or about its vertical axis. Thus, the horizontal stiffness at the load support interface is governed exclusively by the horizontal shear stiffness of the rubber laminate assembly. Also, like the other art discussed above, substantial structure and additional component parts are required in such a design.

SUMMARY OF INVENTION

It is therefore an object of this invention to provide a reduced horizontal stiffness gas spring assembly for a vibration isolation system. It is a further object of this invention to provide such a reduced horizontal stiffness gas spring assembly which improves horizontal vibration isolation without the need for intricate or generally high tolerance fabrication techniques. It is a further object of this invention to provide such a reduced horizontal stiffness gas spring assembly which effectively, inexpensively, and efficiently reduces the horizontal stiffness of the air or gas spring at the load interface portion of the spring. This invention results from the realization that reduced horizontal stiffness of a vibration isolation system which utilizes a gas or airspring is achieved by a resilient vibration damper unit such as a series of elastomeric washers residing within a hollow piston which, when coupled to the load supported by the piston, effectively allows a pivoting action when either the housing and/or the load support interface portion of the gas spring is displaced laterally thereby reducing the effective horizontal stiffness at the load support interface of the gas spring. To further reduce the horizontal stiffness of the gas spring, pivot means may be coupled externally to the housing as disclosed in the parent application, Ser. No. 07/858,569, filed Mar. 27, 1992.

This invention features and may suitably comprise, include, consist essentially of, and/or consist of a gas spring assembly for a vibration isolation system. The system includes a housing; a rolling convolution type flexible gas seal within the housing; and a piston receivable by the seal. The piston has a chamber and there is a resilient vibration damper unit residing in the chamber for reducing the horizontal stiffness of the gas spring.

The resilient vibration damper unit may include a plurality of elastomeric members and may further include rigid members disposed between each pair of elastomeric members. The elastomeric members may be washer shaped for further reducing the horizontal stiffness of the gas spring assembly. The rigid members may also be washer-shaped.

Pivot means, externally coupled to the housing, may also be provided for allowing the housing to pivot further reducing the horizontal stiffness of the gas spring assembly. The pivot means include a plurality of elastomeric members and rigid members disposed between each pair of elastomeric members. The elastomeric members and the rigid members are typically washer shaped for further reducing the horizontal stiffness of the gas spring assembly.

This invention also features a reduced horizontal stiffness vibration isolation system comprising a gas spring assembly including a piston, the assembly having a vertical axis; and first pivot means having a load support interface, the first pivot means coupled to the piston for pivoting upon transmission of a force to the load support interface in a direction other than along the vertical axis. A second pivot means is coupled externally to the gas spring assembly for further reducing the horizontal stiffness of the gas spring assembly.

DISCLOSURE OF PREFERRED EMBODIMENT

Other objects, features and advantages will occur to those skilled in the art from the following description of a preferred embodiment and the accompanying drawings, in which.

Figure 1:
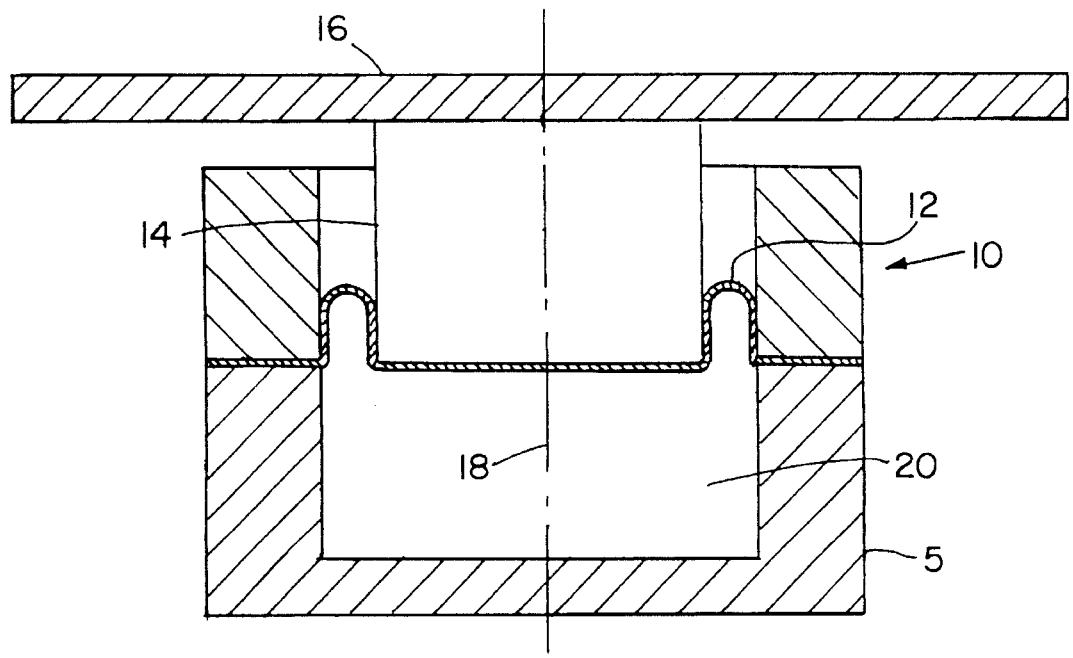
FIG. 1 is a schematic cross sectional diaphragm of a prior art gas spring assembly used in vibration isolation systems.

Conventional airspring assembly 10, FIG. 1, may include housing 5, a rolling convolution type air seal 12, and piston 14 which supports vibration-free work station table top 16 often used for conducting delicate or critical measurements, etc. Vibrations received vertically by housing 10 in a direction along axis 18 will not be communicated to table top 16 because piston 14 is freely displaceable in the vertical direction and hence assembly 10 has a low stiffness in the vertical direction. The operating pressure, piston area, and volume capacity of chamber 20, governs the vertical stiffness of the system.

As discussed in the Background of the Invention above, however, assembly 10 is inherently stiff in the horizontal direction. As a consequence, vibration isolation is significantly less efficient horizontally than for the vertical direction and horizontal displacement of housing 5 by vibrations which are transmitted to it may in turn be transmitted to table top 16.

Figure 2:
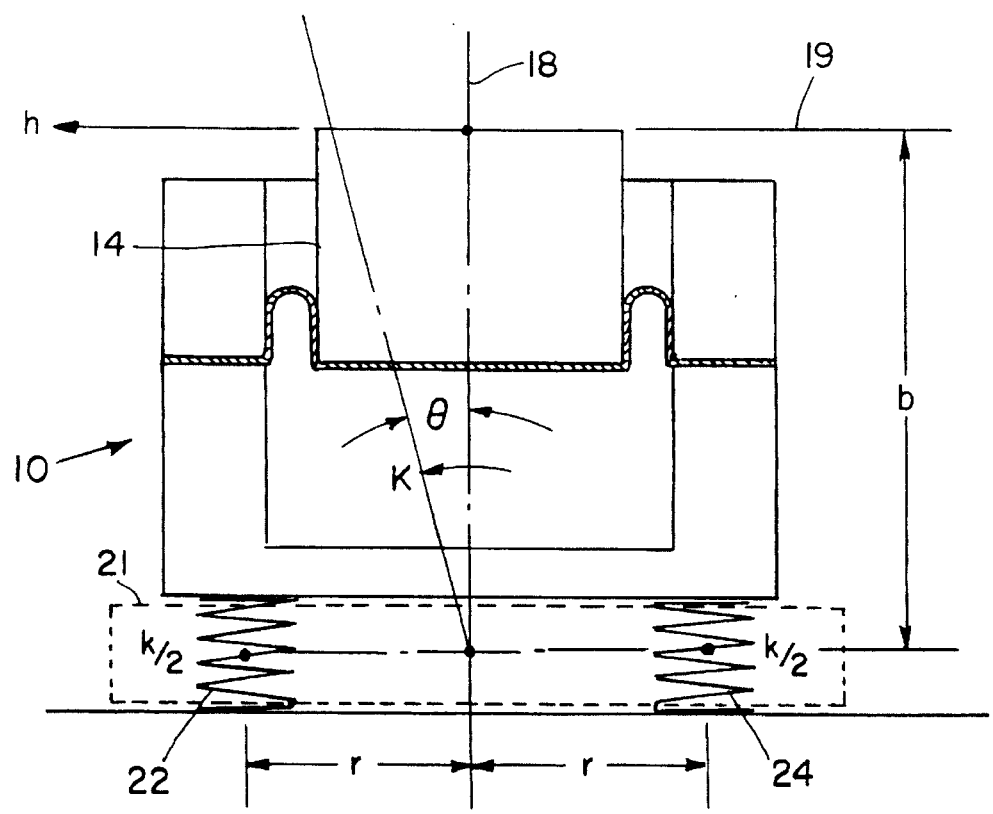
FIG. 2 is a schematic cross sectional conceptualized view of the reduced horizontal stiffness vibration isolation system according to the invention of the parent application.

Using principles of dynamics, however, it can be shown that the horizontal stiffness h of the top of piston 14, FIG. 2, can be reduced by coupling pivot means 21, represented in FIG. 2 by coil springs 22 and 24, externally with assembly 10. Each spring 22 and 24 has a stiffness k/2 and are spaced at a radius r from vertical axis 18. The center plane of pivot means 21 is at an elevation b below the plane of the top of the piston 14, or the load support interface portion, where load will be supported (e.g., table top 16, FIG. 1). Mathematically then, the rotational stiffness K of pivot means 21 is:

$$K = kr^2 \qquad (1)$$

and the effective horizontal stiffness h at the top of piston 14 is:

$$h = K/b^2 = k(r/b)^2. \qquad (2)$$

Therefore, it will be appreciated that the rotational stiffness K of pivot means 21 directly effects the horizontal stiffness h of assembly 10. Upon displacement of either pivot means 21 or piston 14 by vibrations other than along axis 18, springs 22 and 24 will allow a slight pivoting of assembly 10 which in turn reduces the horizontal stiffness h at the top of piston 14 thereby achieving reduced horizontal stiffness in a vertical vibration isolation system otherwise inherently stiff in the horizontal direction.

A significant feature of this invention is that the piston and convolution are unconstrained vertically and thereby free to rotate about any horizontal axis independently of any coupled rotation of the airspring body during horizontal disturbance. This feature insures that a load supported on top of a multiple group or system of airspring isolators according to this invention can remain level and horizontal to the base and not be induced to rotate during horizontal disturbance.

Figure 3:
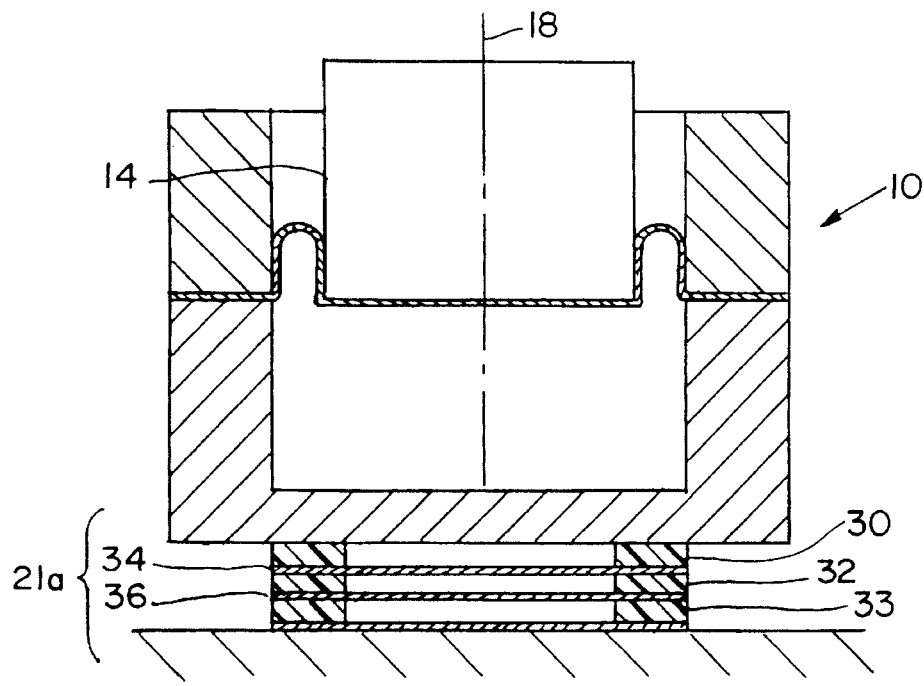
FIG. 3 is a schematic cross sectional view of one embodiment of the reduced horizontal stiffness gas spring assembly for a vibration isolation system according to the parent application.

Implemented as a series of resilient elastomeric washer type members 30, 32, 33 separated by rigid plastic or metal type members 34 and 36, FIG. 3, pivot means 21 will have the desired rotational stiffness to induce a pivoting or rocking motion of airspring assembly 10 relative to vertical axis 18 of airspring assembly 10 when either piston 14 or damper 21a is displaced laterally or even in any direction other than along axis 18. Although a rolling convolution type flexible seal and piston arrangement is shown in this preferred embodiment, bellows type or other vertically displaceable springs could be coupled with rocking vibration damper or pivot means 21a employed in the manner herein described. Also, although washer-type members are shown, other configurations and arrangements could be utilized so long as the k,b and r parameters discussed in reference to FIG. 2 suitably provide the desired horizontal stiffness h of the spring assembly along its horizontal axis 19 for a given application.

Figure 4:
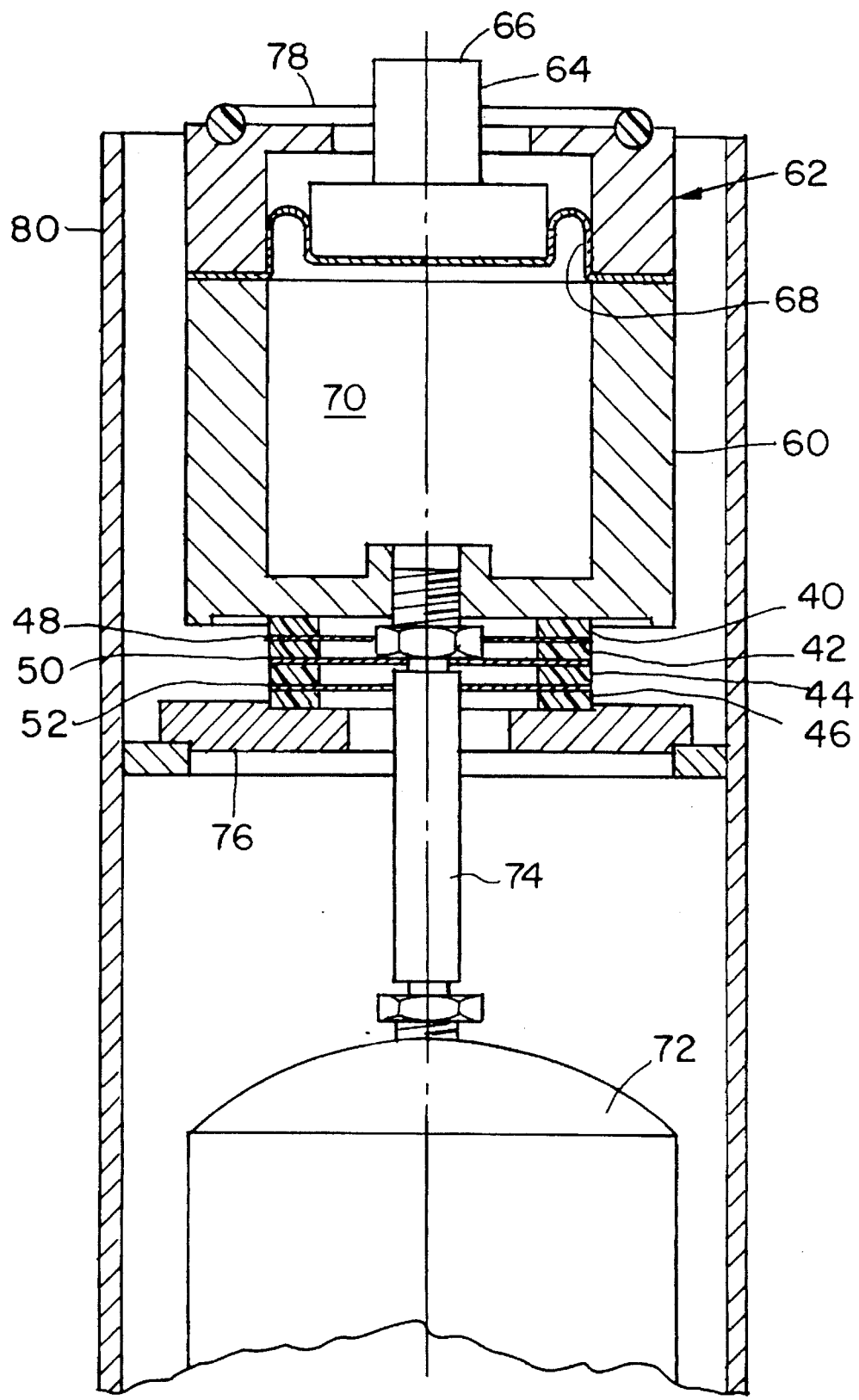
FIG. 4 is a schematic cross-sectional view of the gas spring assembly of FIG. 3 implemented in a vibration isolation system according to the invention of the parent application.

In a preferred embodiment there are four resilient neoprene washer shaped type pads 40, 42, 44, and 46, FIG. 4, each separated by rigid plastic, steel or aluminum discs 48, 50, and 52. Each pad may have a height of between $1/16$–$1/2$", a 1–2" outside diameter and a $1/8$–$1/2$" inside diameter for a 200 pound capacity airspring with a 3" outside diameter housing available from Kinetic Systems, Inc., 20 Arboretum Road, Box 414 Boston, Mass. 02131, Model No. 2212 or Series 9100. Alternatively, for a 4 ¾" diameter airspring housing with a 800 pound capacity, the pads may have a range of 2–3 ½" outside diameter and 1–1 ½" inside diameter. The geometry parameters for the plastic, steel or aluminum discs generally mirror those of the pads. Of course these parameters may be varied and different materials can be used to achieve a horizontal stiffness desired in any given system. Bonding material such as DEVCON #4404 cyonodrylate adhesive may be used to physically secure the pads and discs in this manner.

Upper pad 40 is mounted to the housing 60 of airspring 62 which includes piston 64 having load support interface portion 66 and riding on rolling convolution air seal 68. First air cylinder 70 may be in communication with a second air chamber 72 via tubing 74 to further increase the volume of the system for increased vertical isolation. Washer-shaped type pads 40, 42, 44 and 46 thereby achieve the rotational and pivoting motion desired for reduced horizontal stiffness and also allow for communication between air cylinder 70 and second air chamber 72 via tubing 74. Lower pad 46 is securely bonded to rigid seat 76 with a high strength adhesive or epoxy. Finally, rubber 0-ring stop 78 may be incorporated to prevent the load residing on interface 66 from striking housing 62 during severe vibrational disturbance. The whole assembly may be mounted within table leg 80 of a vibration isolation table (not shown) as will be understood by those skilled in the art.

Figure 5:
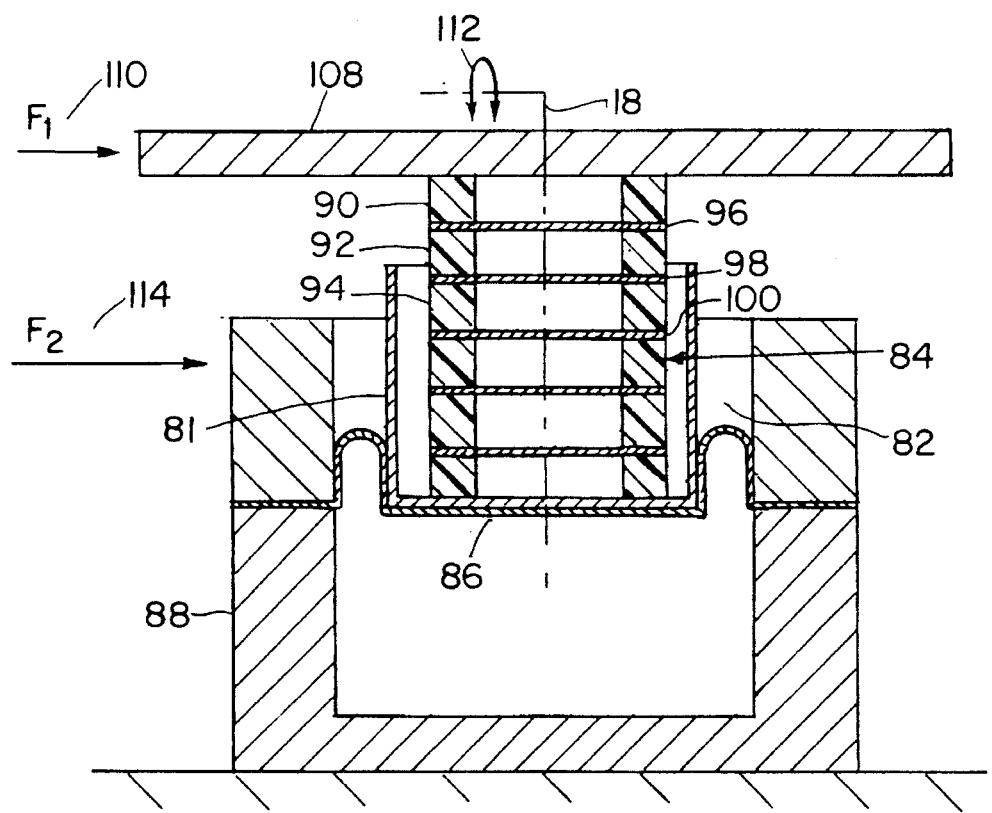
FIG. 5 is a schematic cross sectional view of the reduced horizontal stiffness gas spring assembly according to this invention.

In this continuation-in-part application, however, the piston 81, FIG. 5 has a chamber 82 in which resides resilient vibration damper unit 84. Piston 81 is received by rolling convolution type gas seal 86 within housing 88. Damper unit 84 includes a plurality of elastomeric washer-shaped members 90, 92, 94 etc. disposed between rigid members 96, 98, 100, etc. as shown. Top elastomeric washer-shaped member 90 may be directly in communication with table top 108 thereby serving as the load support interface, or an additional load support interface member may rest on top member 90 in between it and the table top 108.

Now, when a force $F_1$ such as a vibration as shown at 110 is transmitted directly to table top 108 (or the load support interface) in any direction except along vertical axis 18, vibration damper 84 translates and rocks or pivots in the direction shown by arrow 112 about a horizontal axis transverse to axis 18 thereby reducing the horizontal stiffness of the gas spring. The same result is obtained should force $F_2$ as shown at 114 be transmitted to housing 88 (or any portion of the vibration isolation system in contact with housing 88). In a preferred embodiment the make-up of vibration damper unit 84 is the same as or similar to damper 21a, FIG. 3. There are resilient neoprene washer shaped type pads 90, 92, 94, FIG. 5, each separated by rigid plastic steel or aluminum discs 96, 98, 100. Each pad may have a height of between 1/16–1/2, a 1–2" outside diameter and a 1/8–1/2" inside diameter for a 200 pound capacity airspring with a 3" outside diameter housing available from Kinetic Systems, Inc., 20 Arboretum Road, Box 414, Boston, Mass. 02131, Model No. 2212 or Series 9100. Alternatively, for a 4 3/4" diameter airspring housing with a 800 pound capacity, the pads may have a range of 2–3 1/2" outside diameter and 1–1 1/2" inside diameter. The geometry parameters for the steel or aluminum discs generally mirror those of the pads. Of course these parameters may be varied and different materials can be used to achieve a horizontal stiffness desired in any given system. Bonding material such as DEVCON #4404 cyonodrylate adhesive may be used to physically secure the pads and discs in this manner.

Figure 6:
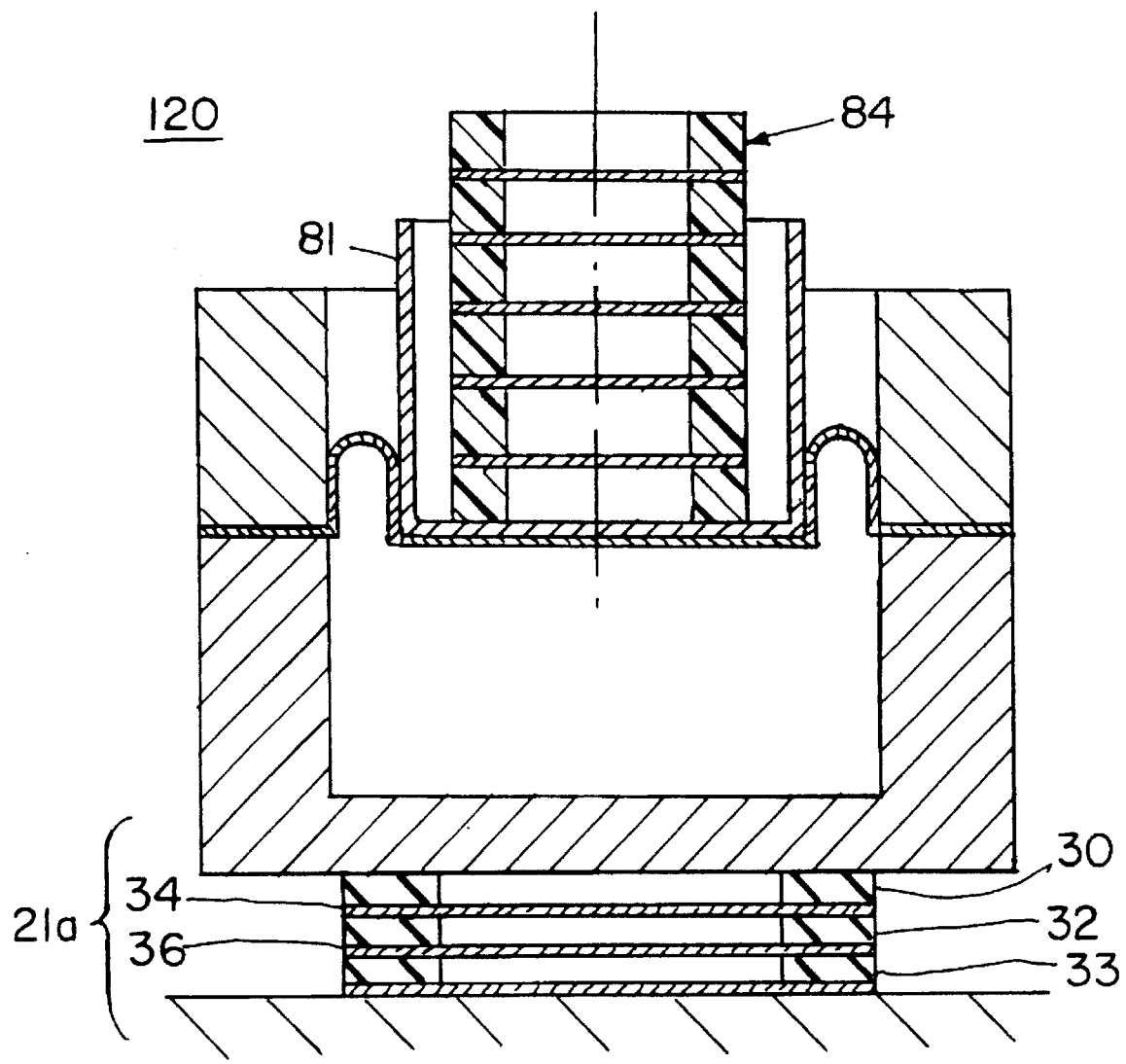
FIG. 6 is a schematic-cross-sectional view of a gas spring assembly of FIG. 5 further including pivot means coupled externally to the gas spring assembly.

Damping unit 84, FIG. 5, may be implemented in vibration isolation system 120, FIG. 6, which also includes pivot means 21a coupled externally thereto discussed in relation to FIG. 3 for a further reduction in horizontal stiffness. Vibration isolation system 120 may be implemented in accordance with the design shown in FIG. 4.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A gas spring assembly for a vibration isolation system comprising:

a housing a rolling convolution type flexible gas seal within said housing;

a piston receivable by said seal, said piston having a chamber; and a resilient vibration damper unit residing in said chamber for reducing the horizontal stiffness of the gas spring, said resilient vibration damper unit including a plurality of elastomeric members.

2. The gas spring assembly of claim 1 in which said resilient vibration damper unit further includes rigid members disposed between said plurality of elastomeric members.

3. The gas spring assembly of claim 2 in which said rigid members are washer-shaped.

4. The gas spring assembly of claim 1 in which said elastomeric members are washer shaped for further reducing the horizontal stiffness of the gas spring assembly.

5. A reduced horizontal stiffness vibration isolation system comprising:

a gas spring assembly including a piston, said assembly having a vertical axis;

first pivot means having a load support interface, said first pivot means coupled to said piston for pivoting upon transmission of a force to said load support interface in a direction other than along said vertical axis; and second pivot means coupled externally to said spring assembly for further reducing the horizontal stiffness of said gas spring assembly.

6. A gas spring assembly for a vibration isolation system comprising:

a housing;

a rolling convolution type flexible gas seal within said housing;

a piston receivable by said seal, said piston having a chamber;

a resilient vibration damper unit residing in said chamber for reducing the horizontal stiffness of the gas spring; and pivot means, externally coupled to said housing, for allowing said housing to pivot further reducing the horizontal stiffness of the gas spring assembly.

7. The gas spring assembly of claim 6 in which said pivot means include a plurality of elastomeric members.

8. The gas spring assembly of claim 7 in which said pivot means further include rigid members disposed between said plurality of elastomeric members.

9. The gas spring assembly of claim 8 in which said rigid members are washer-shaped.

10. The gas spring assembly of claim 7 in which said elastomeric members are washer shaped for further reducing the horizontal stiffness of the gas spring assembly.

\* \* \* \* \*